United States Patent
Yoon

(10) Patent No.: US 6,320,677 B1
(45) Date of Patent: Nov. 20, 2001

(54) METHOD AND APPARATUS FOR REMOTELY CONFIRMING AND RECEIVING MESSAGE RECEIVED BY A FACSIMILE MACHINE

(75) Inventor: Chan-Kook Yoon, Daegukwangyeok (KR)

(73) Assignee: SamSung Electronics C., Ltd, Suwon (KR)

( * ) Notice: Subject to any disclaimer, the term of this patent is extended or adjusted under 35 U.S.C. 154(b) by 762 days.

(21) Appl. No.: 08/655,126

(22) Filed: May 28, 1996

(30) Foreign Application Priority Data

May 27, 1995 (KR) .................................................. 95-13570

(51) Int. Cl.$^7$ ...................................................... H04N 1/00
(52) U.S. Cl. ................ 358/434; 379/102.01; 379/106.01
(58) Field of Search ..................................... 358/400, 407, 358/402, 404, 405, 434, 435, 410, 479, 436, 438, 439, 444, 440; 379/100.01, 100.06, 100.09, 100.12, 100.15, 102.01, 102.02, 106.01

(56) References Cited

U.S. PATENT DOCUMENTS

| | | | |
|---|---|---|---|
| 4,654,718 | 3/1987 | Sueyoshi | 379/100.07 |
| 5,090,049 | 2/1992 | Chen | 379/100.09 |
| 5,127,047 | 6/1992 | Bell et al. | 379/100.06 |
| 5,131,020 | 7/1992 | Liebesny et al. | 455/422 |
| 5,138,653 | 8/1992 | Le Clercq | 379/93.24 |
| 5,224,156 | * 6/1993 | Fuller et al. | 379/100.08 |
| 5,291,302 | * 3/1994 | Gordon et al. | 358/400 |
| 5,349,636 | 9/1994 | Irribarren | 379/89 |
| 5,357,562 | 10/1994 | Metser et al. | 379/67 |
| 5,404,231 | 4/1995 | Bloomfield | 358/400 |
| 5,446,557 | 8/1995 | Haze | 358/444 |
| 5,452,099 | 9/1995 | Von Meister | 358/403 |
| 5,475,738 | 12/1995 | Penzias | 379/67 |
| 5,483,580 | 1/1996 | Brandman et al. | 379/88 |

FOREIGN PATENT DOCUMENTS 2190384  2/1995  (CN) .............................. H04M/1/64

\* cited by examiner

*Primary Examiner*—Jerome Grant, II
(74) *Attorney, Agent, or Firm*—Robert E. Bushnell, Esq.

(57) ABSTRACT

A received message remote confirmation and reception method and apparatus transmits a list of messages received by a facsimile machine to a user who is remotely located so that the user can remotely confirm and receive only a desired one of a plurality of messages received by his/her facsimile machine. The remote confirmation and reception includes the steps of: checking whether or not a secret number has been inputted, in response to an input of a ring signal according to a call received when the facsimile machine has been placed in a remote reception mode; transmitting the list of received reception messages stored in a memory of the facsimile machine to the calling party when a secret number has been correctly inputted as determined in a secret number checking step; and, after transmitting the list, checking whether or not a received message selection number has been inputted; and transmitting a reception message corresponding to the selection number to the calling party when a received message selection number has been inputted.

8 Claims, 3 Drawing Sheets

METHOD AND APPARATUS FOR REMOTELY CONFIRMING AND RECEIVING MESSAGE RECEIVED BY A FACSIMILE MACHINE

CLAIM OF PRIORITY

This application make reference to, incorporates the same herein, and claims all benefits accruing under 35 U.S.C §119 from an application entitled METHOD FOR REMOTELY CONFIRMING MESSAGES RECEIVED FROM FACSIMILE SYSTEM earlier filed in the Korean Industrial Property Office on May 27, 1995 and three assigned Ser. No. 13570/1995.

BACKGROUND OF THE INVENTION

1. Field of the Invention

The present invention relates to a facsimile transmission processes and machines, and more particularly, to a method and an apparatus for remotely selecting messages received from the facsimile machine and confirming and the reception of the messages at a remote location.

2. Description of the Related Art

In general, a facsimile machine prints and output messages received from a facsimile machine of a calling party. If the facsimile machine is out of its printable medium such as paper, the facsimile machine temporarily stores received messages in a memory and then prints the stored message received when paper is added to the machine. Thus, it is possible for a user to confirm that the message has been printed on the paper.

A facsimile machine using a conventional method for remotely confirming that a message has been received is disclosed in Korean Patent Application No. 92-19761 filed by the same applicant as of the present application. That method enables the user who is at a remotely located place from his or her facsimile machine to confirm whether or not messages have been received. In accordance with the conventional method as exemplified by the Equipment For Notifying The Arrival of a Correspondence At A Facsimile Receive, To The Ultimate Addressee, U.S. Pat. No. 4,654,718 to T. Sueyosgi, the Facsimile Message Recorder And Relay System And Method, to T. N. Chen, U.S. Pat. No. 5,090,049, the Facsimile Machine Having User Notification Capability, to J. F. Bell, et al., U.S. Pat. No. 5,127,047, and the Method And Apparatus For Facsimile Enhancement, to G. V. Fuller, et al., U.S. Pat. No. 5,224,156, a remotely located user is able to be automatically notified of the reception of a facsimile message and in some instances, to have that message forwarded to the remote location in its entirety. In order for the user to confirm the receipt of a message, the facsimile machine determines whether or not a calling tone CNG has been inputted from the calling party in response to an input of a ring signal when a remote reception mode has been set. If the calling tone CNG has been received from the calling party, the facsimile machine receives the message from the calling party, and then stores the received message in its memory. On the other hand, if the calling tone has not been received from the calling party, the facsimile machine checks for an input of a secret number. Such security systems are representative by Method And System For Storage And/Transmission Of Confidential Facsimile Document by W. Von Meister, U.S. Pat. No. 5,452,099, the Sender-Based Facsimile Store and Forward Facility by M. C. Bloomfield, U.S. Pat. No. 5,404,231 and Automated Facsimile/Voice Managing System by R. Metser, et al., U.S. Pat. No. 5,357,562. If the secret number has been correctly received, the facsimile machine transmits the received message stored in the memory to the calling party. Other efforts, such as that represented by Interface System And Method For Interconnecting A Voice Message System And An Interactive Response System by R. Irribarren, U.S. Pat. No. 5,349,636, the Facsimile Telecommunication System And Method by R. J. Gordon, et al., U.S. Pat. No. 5,459,584 and the Facsimile Telecommunication System And Method by R. J. Gordon, U.S. Pat. No. 5,291,302, the Interface Between Tert And Voice Message System of A. A. Penzias, U.S. Pat. No. 5,475,738, and the Method And Apparatus For Non-Simultaneous Transmittal And Storage Message And Digital Text Or Image by Y. Brandman, et al., U.S. Pat. No. 5,483,580 contemplate a response to an inquiry presenting a message identification number, by transmitting a voice message generally representing the text of the facsimile message. Although there may be a plurality of received messages, the above method remotely confirms and transmits all of the received messages. Therefore, there may arise problems in that the cost for telephone usage is unnecessarily high due to confirmation and transmission of all of the messages received including wrongly received messages and unsolicited advertisement messages and in that it takes a long period of time to confirm and transmit the received messages.

SUMMARY OF THE INVENTION

It is therefore, an object of the invention provide and improved process and telecommunication apparatus.

It is another object to provide a received message remote confirmation technique for of transmitting a list of messages receive by a user's facsimile machine to a remotely located user so that the user may remotely receive only a desired one of a plurality of messages received by the user's facsimile machine.

It is another object to provide a received message remote confirmation technique for remotely confirming a list of the messages received by the user's facsimile machine and thereby enable remote reception of only a desired one of a plurality of messages received therefrom.

These and other objects may be achieved according to the principles of the present invention with a process and apparatus providing remote confirmation of messages received by a distantly located facsimile machine having a memory for storing a secret number set by a user and received messages. A determination is made of whether or not the secret number has been received by the distantly located facsimile machine in response to an input of a ring signal by a calling party when the facsimile machine has been set in a remote reception mode, and a list of received messages stored in the memory is transmitted to the calling party when the secret number has been correctly input by the calling party. After transmitting the list of received messages, a determination is made of whether or not a received message selection number has been input by the calling party, and one of the stored facsimile messages corresponding to the selection number received from the calling party is re-transmitted by the facsimile machine when the received message selection number has been input by the calling party.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
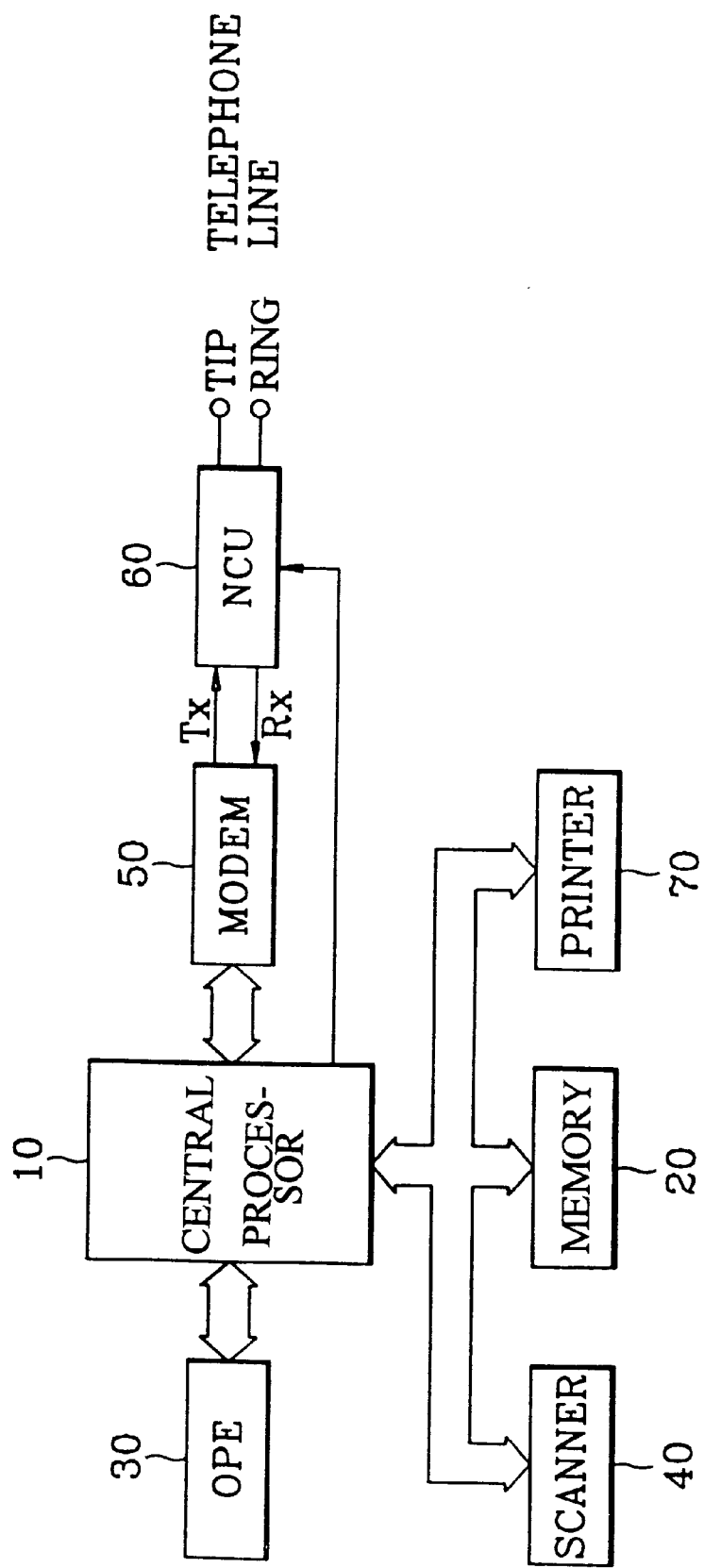
FIG. 1 is a block diagram of a facsimile machine constructed according to the principles of the present invention.

FIG. 1 is a block diagram of a facsimile machine according to the present invention. FIG. 1 illustrates a central processor 10, a memory 20, an operating panel OPE 30, a scanner 40, a modem 50, a network control unit NCU 60, and a printer 70. The central processor 10 controls the facsimile machine according to a set program. The memory 20 stores an operating program of the central processor 10 and also stores data generated depending upon performance of the program of the central processor 10. The operating panel 30 has a plurality of keys and applies key data in response to the operation of the keys to the central processor 10 to display an operating state of the system by display data of the central processor 10. The scanner 40 scan documents received by the facsimile machine and converts images of the received documents into binary information which is supplied to the central processor 10. The modem 50 modulates and demodulates input and output signals of the central processor 10. The network control unit NCU 60 forms a speech path between a telephone line and the modem under control of the central processor 10. The printer 70 prints information outputted by the central processor 10.

Figure 2A:
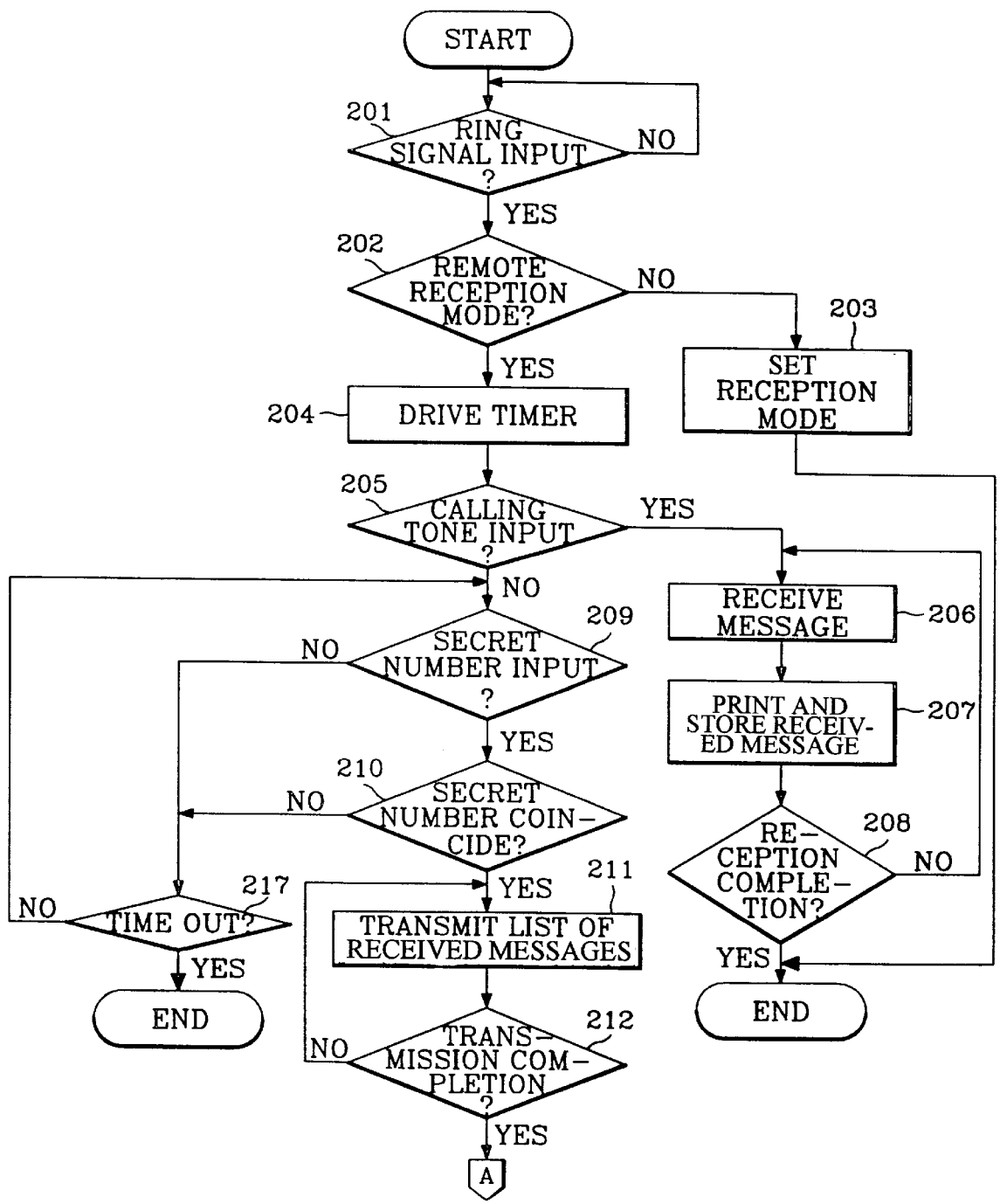
FIGS. 2A and 2B together form a flowchart illustrating the remote confirmation for the reception of messages according to the present invention.
Figure 2B:
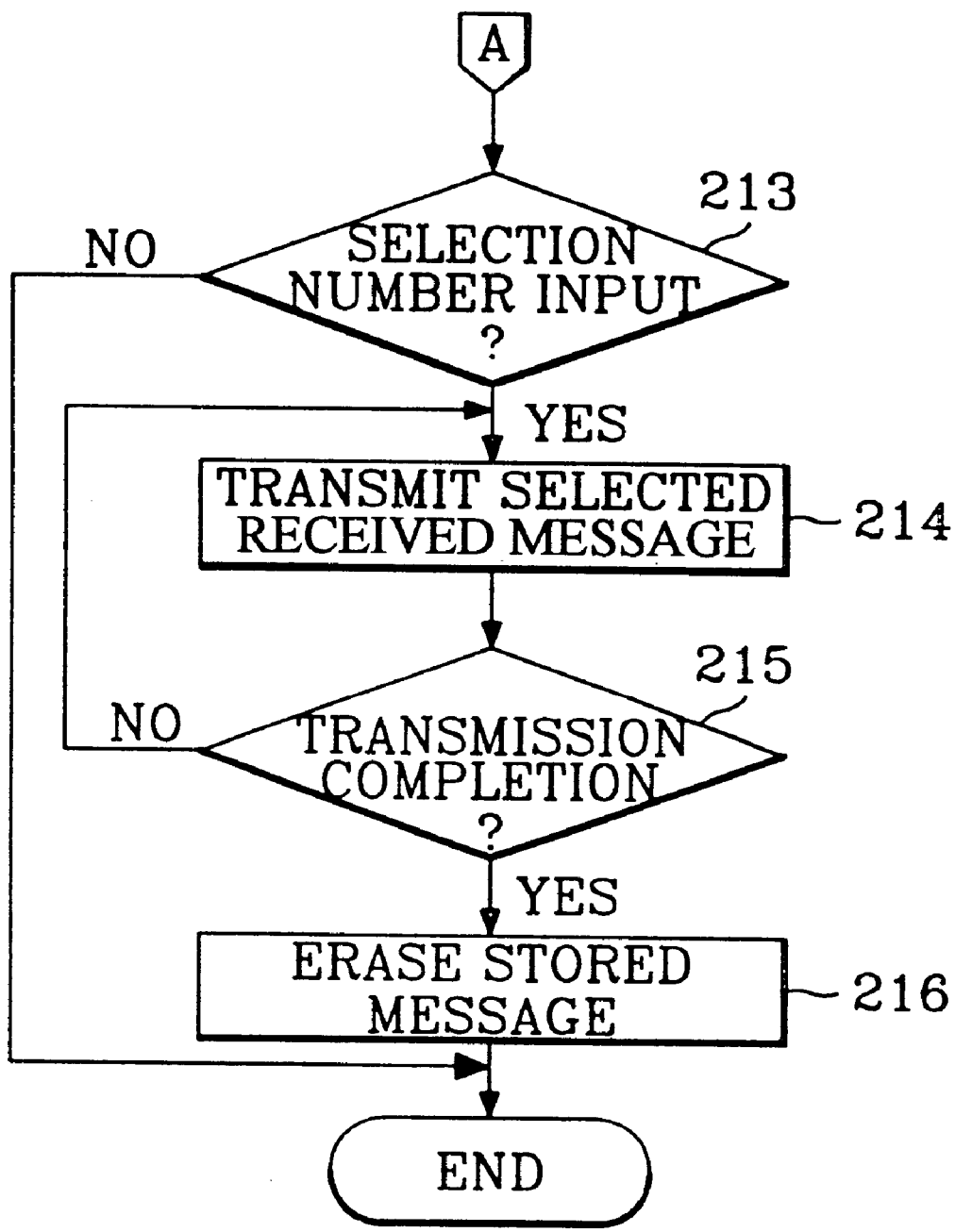

FIGS. 2A and 2B together form flowchart illustrating the remote confirmation of the received messages according to the present invention. FIGS. 2A and 2B illustrate the steps of checking whether or not a calling tone has been inputted by a calling party, in response to an input of a ring signal according to a call when the facsimile machine has been placed in a remote reception mode; receiving a message from the calling party when the calling tone has been inputted from the calling party as determined in the calling tone checking step, and storing the received message in the memory; checking whether or not a secret number has been inputted when the calling tone has not been inputted by the calling party as determined in the calling tone checking step; transmitting a list of the received messages stored in the memory to the calling party when the secret number has been correctly inputted as determined in the secret number checking step; transmitting the list of the received messages to the calling party and checking whether or not a received message selection number has been inputted; transmitting a received message corresponding to the selection number to the calling party when the received message selection number has been inputted, and ending operations when the secret number has not been inputted, or when a secret number has been inputted but is not equal to a predetermined secret number.

Hereinafter, the operation of the preferred embodiment of the present invention will be explained in detail with reference to FIGS. 1, and 2A and 2B.

First of all, in order for a user located in a remote location to confirm messages received by the facsimile machine as shown in FIG. 1, the user previously sets a remote reception mode in the facsimile machine by using the keys on the operating panel 30 and then sets his secret number in the memory 20.

If a ring signal from an external call is supplied to the NCU 60 through the telephone line, the NCU 60 detects an input of the ring signal and informs the central processor 10 of the input thereof. The central processor 10 determines, at step 201 in FIG. 2, whether or not a ring signal has been inputted. If the ring signal has been inputted, the operation proceeds to step 202. At step 202, the central processor 10 confirms that the reception mode has been set, and then determines whether the reception mode has been set as a remote reception mode. If the remote reception mode has not been set, at step 203, the central processor 10 sets the reception mode.

However, if the remote reception mode has been set, at step 204, the central processor 10 drives an interior timer, and then at step 205, the central processor 10 determines whether or not a calling tone has been inputted to the modem 50. If the calling tone has been inputted, it is determined that the calling party is a facsimile machine in a transmission mode. At steps 206–208, the central processor 10 receives the message transmitted from the calling party through the modem 50 and prints the received message on a printable medium, such as paper, by the printer 70 and also stores it in the memory 20. A signal received from the calling party is demodulated in the modem 50 through the NCU 60 and is also decoded in the central processor 10. Then, the signal is stored in the memory 20 and is outputted to the printer 70.

On the other hand, if a calling tone has not been inputted at step 205, the central processor 10 checks for the input of a secret number at step 209. If the calling party is a remotely located user, after the completion of the input of the ring signal, the user inputs the secret number by using a telephone of the facsimile machine at the remote location so as to confirm the messages received by his/her facsimile machine. When the secret number is inputted at step 209, the central processor 10 checks, at step 210, whether the inputted secret, number coincides with the secret number previously set in the memory 20. If the secret numbers coincide, at step 211, the central processor 10 transmits a list of the received messages stored in the memory 20 to the facsimile machine of the calling party through the modem 50. Recorded in the list are the transmitter's name, telephone number, reception time, and the number of received sheets, etc. Subsequently, the central processor 10 checks, at step 212, whether or not the list of received messages has been transmitted completely. If the transmission of the list of received message has been completed, the operation proceeds to step 213. After the remotely located user receives and confirms the list of received messages, the user presses a desired one of a plurality of received message selection numbers by using the facsimile machine at the remote location. Then, at step 213, the central processor 10 checks whether or not the selection number has been inputted. If the selection number has been inputted, the operation proceeds to step 214. At step 214, the central processor 10 reads the received message corresponding to the selection number from the memory 20, and then transmits the read received message to the telephone line through the modem and the NCU 60. The calling party can confirm the received message. Thereafter, at step 215, the central processor 10 checks whether or not the received message has been transmitted. If the transmission of the reception message has been completed, the operation proceeds to step 216 and at step 216 the central processor 10 erases the received message stored in the memory 20 to thereby end the program.

Alternatively, at steps 209–210, if the secret number has not been inputted, or if the inputted secret number is not equal to the stored secret number, the operation proceeds to step 217. At step 217, the central processor 10 checks whether or not a "time out" has been detected. If a "time out" has been detected, the central processor ends its operation. However, if the "time out" has not been detected, the operation returns to step 209 to repeatedly perform the above operations.

Accordingly, the remotely located user calls his/her facsimile machine and confirms the list of received messages so as to select and receive the desired received message. Thus, it is possible for the user to receive only the desired one of a plurality of messages received by his/her facsimile machine.

As mentioned above, the present invention efficiently enables the user to confirm and receive the messages received by his/her facsimile machine even at the remotely located place. If there are a plurality of received messages, the user can confirm and receive only the desired one of the plurality of messages. Hence, the cost for unnecessary telephone use is cut since it is not necessary to confirm and transmit wrongly received messages and advertisement messages. In addition, in accordance with the received message confirmation technique implemented according to the present invention, it is possible for the user to rapidly confirm and receive the received messages.

What is claimed is:

1. A method for remotely confirming and receiving messages received from a local facsimile machine having a memory for storing a secret number set by a user and received messages, comprising the steps of:

checking whether or not the secret number has been inputted, in response to an input of a ring signal by a remotely located facsimile machine of a remotely located calling party when the local facsimile machine has been set in a remote reception mode;

transmitting a list of received messages stored in the memory to said remotely located facsimile machine of a calling party when the secret number has been correctly inputted by the calling party as determined in the secret number checking step;

after transmitting the list of received messages, checking whether or not a received message selection number has been inputted by the calling party; and transmitting a received message corresponding to the received selection number from the local facsimile machine to the facsimile machine of the calling party when the received message selection number has been inputted by the calling party.

2. The reception message remote confirmation and reception method as claimed in claim 1, further comprising a step of printing the received message by the remotely located facsimile machine.

3. A method for remotely confirming and receiving messages received from a local facsimile machine having a memory for storing a secret number set by a user and received messages, comprising the steps of:

checking whether or not a calling tone has been inputted from a remotely located facsimile machine of a remotely located calling party, in response to an input of a ring signal when the facsimile machine has been set in a remote reception mode;

receiving a message from the calling party when the calling tone has been inputted from the calling party as determined in the calling tone checking step, and storing the received message in the memory;

checking whether or not a secret number has been inputted by the calling party when the calling tone has not been inputted by the calling party as determined in the calling tone checking step;

transmitting a list of received messages stored in the memory from the local facsimile machine to the facsimile machine of the calling party when the secret number has correctly been inputted by the calling party as determined in the secret number checking step;

after transmitting the list of received messages to the calling party, checking whether or not a received message selection number has been inputted by the calling party; and transmitting a received message corresponding to the received message selection number from the local facsimile machine to the facsimile machine of the calling party when the received message selection number has been inputted by the calling party.

4. A method for remotely confirming and receiving messages received from a local facsimile machine having a memory means for storing a secret number set by a user and received messages, comprising the steps of:

confirming that the local facsimile machine is set in a reception mode when a ring signal is inputted by a remotely located facsimile machine of a remotely located calling party, and checking whether or not the reception mode is set as a remote reception mode;

driving a timer when the reception mode is set as said remote reception mode as determined in the reception mode checking step, and checking whether or not a calling tone has been inputted by the calling party;

receiving a message from the calling party when the calling tone has been inputted by the calling party as determined in the calling tone checking step, storing the received message in the memory, and printing the received message;

checking whether or not a secret number has been inputted by the calling party when the calling tone has not been inputted by the calling party as determined in the calling tone checking step;

transmitting the list of the received messages stored in the memory from the local facsimile machine to the facsimile machine of the calling party when the secret number has been correctly inputted by the calling party as determined in the secret number checking step;

after transmitting the list of received messages to the calling party, checking whether or not a received message selection number has been inputted by the calling party; and transmitting a received message corresponding to the received message selection number from the local facsimile machine to the facsimile machine of the calling party when the received message selection number has been inputted by the calling party.

5. An apparatus for remotely confirming and receiving messages received from a local facsimile machine having a memory for storing a secret number set by a user and received messages comprising:

a means for checking whether or not the secret number has been inputted, in response to an input of a ring signal by a calling party when the local facsimile machine has been set in a remote reception mode;

a means for transmitting a list of received messages stored in the memory from the local facsimile machine to a remotely located facsimile machine of a remotely located calling party when the secret number has been correctly inputted by the calling party as determined by the secret number checking means;

a means for checking, after transmitting the list of received messages, whether or not a received message selection number has been inputted by the calling party; and a means for transmitting a received message corresponding to the received selection number from the local facsimile machine to the facsimile machine of the calling party when the received message selection number has been inputted by the calling party.

6. The apparatus for remotely confirming messages as recited in claim 5, further comprising a printer for printing the received message.

7. An apparatus for remotely confirming and receiving messages received from a local facsimile machine having a memory for storing a secret number set by a user and received messages, comprising:

a means for checking whether or not a calling tone has been inputted from a remotely located facsimile machine of a remotely located calling party, in response to an input of a ring signal when the local facsimile machine has been set in a remote reception mode;

a means for receiving a message from the calling party when the calling tone has been inputted from the calling party as determined by the calling tone checking means, and a means for storing the received message in the memory;

a means for checking whether or not a secret number has been inputted by the calling party when the calling tone has not been inputted by the calling party as determined by the calling tone checking means;

a means for transmitting a list of received message stored in the memory from the local facsimile machine to the remotely located facsimile machine of the calling party when the secret number has correctly been inputted by the calling party as determined by the secret number checking means;

a means for checking, after transmitting the list of received messages to the calling party, whether or not a received message selection number has been inputted by the calling party; and a means for transmitting a received message corresponding to the received message selection number from the local facsimile machine to the facsimile machine of the calling party when the received message selection number has been inputted by the calling party.

8. An apparatus for remotely confirming and receiving messages received from a local facsimile machine having a memory means for storing a secret number set by a user and received messages, comprising:

a means for confirming that the local facsimile machine is set in a reception mode when a ring signal is inputted by a remotely located facsimile machine of a remotely located calling party, and checking whether or not the reception mode is set as a remote reception mode;

a means for driving a timer when the reception mode is set as said remote reception mode as determined in the reception mode checking means, and a means for checking whether or not a calling tone has been inputted by the calling party;

a means for receiving a message from the calling party when the calling tone has been inputted by the calling party as determined by the calling tone checking means, and a means for storing the received message in the memory, and a means for printing the received message;

a means for checking whether or not a secret number has been inputted by the calling party when the calling tone has not been inputted by the calling party as determined by the calling tone checking means;

a means for transmitting the list of the received messages stored in the memory from the local facsimile machine to the facsimile machine of the calling party when the secret number has been correctly inputted by the calling party as determined by the secret number checking means;

a means for checking, after transmitting the list of received messages to the calling party, whether or not a received message selection number has been inputted by the calling; and a means for transmitting a received message corresponding to the received message selection number from the local facsimile machine to the remotely located facsimile machine of the calling party when the received message selection number has been inputted.

\* \* \* \* \*